Patented Dec. 3, 1935

2,023,251

UNITED STATES PATENT OFFICE 2,023,251

RUBBER MATERIAL

Jacob Stein, Brooklyn, N. Y.

No Drawing. Application April 10, 1931,
Serial No. 529,304

1 Claim. (Cl. 106—23)

The present invention relates to rubber or rubberized garments or like articles such as apparel, bed sheets, bags, and numerous other commodities, and broadly has for its object the provision of such rubber articles having the property of neutralizing body acids which comes in contact therewith.

So-called rubber or rubberized products have a uniform property of being impenetrable by air, water, or moisture due to the density of the rubber and because of this characteristic are useful in many ways for the purpose of water-proofing and air-proofing.

When sheet rubber is worn next or adjacent to the human body, particularly in the form of garments such as baby pants, bloomers, and women's sanitary articles, it shuts off the free circulation of air and thereby causes the heat of the body to accumulate in this area resulting in more than normal perspiration. This perspiration together with other emissions from the body containing a solution of acid which, due partly to the lack of proper air circulation, attacks the tissue of the skin, as well as the material of the garment, resulting in irritations of various kinds to the skin and destructive action on the garment. This condition is particularly noticeable in women wearing corsets for reducing purposes, rubber bloomers, dress shields, and the like and in infants wearing so-called baby pants or lying upon rubber crib sheets. This condition is more pronounced where acids from urine are present in conjunction with the ordinary acids emitted from the body through the pores, all resulting in a very uncomfortable, unhealthy, and unsanitary condition.

Therefore, one of the specific objects of the present invention is to eliminate this particular condition and avoid injury to the body as well as prolong the life of the rubber garment, by combining with any desired rubber compound or ingredients in such a way that, when the acids come into contact with the rubber, they are neutralized by it and thereby reducing or eliminating the deleterious action of the emitted acids.

This object is broadly accomplished by combining with any desired rubber compound or mix, a base ingredient, preferably soluble by liquids discharged from the body, such as perspiration, urine, and the like, to neutralize the acid therein and reduce or eliminate the resultant odors. The base material is employed in such proportions and amounts as will best accomplish the above results for the use to which the particular article, employing the compound, is put and in such a manner that said base ingredient will leach out of the rubber compound to neutralize the acids which come in contact with the rubber.

Accordingly, the present invention may be carried out for example by adding to any suitable rubber mix approximately 3% by weight of sodium carbonate. The rubber mix may include coagulated latex of other equivalent coagulated saps or juices obtained from plants and the like; any suitable catalyst or accelerator, if desired; sulfur; and filler, if desired. This mixture is then cured or vulcanized in any desired manner.

It has also been found that borax in quantities of approximately 3% by weight, depending upon the base strength desired, may be substituted for the sodium carbonate. In some instances borax may be preferred because, in corresponding quantities, it is a weaker base. But, it is to be understood that the quantity of the soluble base ingredient may be varied in accordance with the conditions or uses under which the article employing the rubber compound is used so as to present a weaker or stronger neutralizing action. For instance, where the rubber compound is to be used in dress shields a greater amount of the solvent base ingredients would be used than in a rubber compound used in sanitary aprons. Consequently, it is to be understood that the quantity of the leaching or soluble base ingredients will be varied according to the use to which the rubber compound is put, so that it will not cause any violent reactions toward the tissues of the body through its caustic properties, as well as taking into consideration the reactions or dilutions of the leaching material caused by the influences of other ingredients in the rubber compound. The compound of the present invention is particularly useful in dress shields, children's and ladies' sanitary goods, corsets, bathing shoes and caps, infants' wear, crib sheets and hospital sheets, and household aprons, all of which may be made by the usual methods well-known in the art as the compound has all the characteristics which permit it to be manipulated or calendered in the same manner as ordinary rubber mixtures.

In any of the examples given above the soluble base may be any suitable neutralizing material for the purpose defined; the coagulated latex may be any standard form of rubber, gutta-percha, balata, or similar substances; the catalyst or accelerator may be any accepted material such as tetramethylthiourea, disulphide, diphenylguanidine or paranitrosodimethylamine, analine, mercaptobenzothrazole reaction product of diphenylguanidine; and the filler may be of any suitable material such, for instance. as talc, china clay, finely divided silica, and mixtures of various fillers to give special properties.

In order to obtain a thorough mixture and dispersion of the solvent base in the compound, the said base is preferably added to the mixture before or at the time of milling. Artificial emulsions of rubber or of reclaimed rubber may be used in the place of the latex, or mixtures with it can be made.

The rubber composition herein described may contain as low as ⅛ of 1% of a soluble base and as high as 20%, the percentage being varied according to the manner the compound is cured (as an air cure, steam cure, or acid cure) and to the degree or intensity of neutralizing action desired for a particular use. It is preferred, however, to have the percentage of about 3% for ordinary standard mixes and for ordinary purposes.

The present invention contemplates as a new article of manufacture, batches or sheets of the raw unvulcanized rubber mix, above described, which may be shipped and later incorporated into manufactured articles as well as the vulcanized rubber compound or mix or finished articles of manufacture made therefrom or including the same.

While the rubber compound disclosed in this specification has been described particularly in connection with rubber or rubberized garments, wearing apparel or the like, it is susceptible to any use where it is desired to neutralize acid conditions set up or occuring about the material or article formed by the compound. Consequently, it is to be understood that the invention is susceptible to various changes as noted herein above and which fall within the scope of the appending claim.

What is claimed as new is:

Rubber sheeting for making garments to be worn adjacent body emissions and rendered impenetrable to air, water, or moisture by the density of the rubber—characterized by the presence of a basic ingredient thoroughly mixed and dispersed throughout the rubber in a quantity sufficient to neutralize any acid contained in the body emissions in use, and of such a character as to be non-injurious to body tissues, the basic ingredient being selected from the group of compounds consisting of sodium bi-carbonate and borax.

JACOB STEIN.